United States Patent [19]

Harper

[11] Patent Number: 5,473,737
[45] Date of Patent: Dec. 5, 1995

[54] METHOD AND APPARATUS FOR DISPLAYING A COMPOSITE IMAGE MADE UP OF A FOREGROUND IMAGE AND A BACKGROUND IMAGE

[75] Inventor: Jonathan E. Harper, Louisville, Colo.

[73] Assignee: International Business Machines Corporation, Armonk, N.Y.

[21] Appl. No.: 135,120

[22] Filed: Oct. 12, 1993

[51] Int. Cl.⁶ ................................................. G06T 5/00
[52] U.S. Cl. ...................... 395/131; 395/133; 395/135; 395/166; 345/153
[58] Field of Search ............................. 395/119, 121, 395/125, 131, 133, 135, 162–166; 358/163; 345/153

[56] References Cited

U.S. PATENT DOCUMENTS

| | | | |
|---|---|---|---|
| 4,484,187 | 11/1984 | Brown et al. | 345/186 |
| 4,641,255 | 2/1987 | Hohmann | 395/135 |
| 4,695,884 | 9/1987 | Anastassiou et al. | 358/163 |
| 4,789,854 | 12/1988 | Ishii | 345/186 |
| 4,804,948 | 2/1989 | Nishi et al. | 345/186 |
| 4,878,181 | 10/1989 | MacKenna et al. | 395/131 |
| 4,954,970 | 9/1990 | Walker et al. | 395/135 |
| 5,003,491 | 3/1991 | Heckt | 345/114 |
| 5,022,085 | 6/1991 | Cok | 382/1 |
| 5,195,180 | 3/1993 | Takakura et al. | 395/164 |
| 5,216,755 | 6/1993 | Walker et al. | 395/132 |
| 5,327,159 | 7/1994 | Van Aken et al. | 345/153 |

Primary Examiner—Almis R. Jankus
Attorney, Agent, or Firm—William A. Kinnaman, Jr.

[57] ABSTRACT

This invention solves the problem of displaying two images simultaneously in the same screen space, with rapid alteration of the transparency of the foreground image with respect to the background image, without using multiple image planes. This invention creates a single, 8 bit-per-pixel composite image from the foreground and background images. A color look-up table is also created. The color look-up table is a stored data array which indicates the value of each color which can be simultaneously displayed on the screen. By manipulating the color look-up table, the foreground image can be faded in and out rapidly.

10 Claims, 8 Drawing Sheets

METHOD AND APPARATUS FOR DISPLAYING A COMPOSITE IMAGE MADE UP OF A FOREGROUND IMAGE AND A BACKGROUND IMAGE

FIELD OF INVENTION

The present invention relates generally to the processing of electronic images for display. More specifically, the invention relates to a method and system whereby multiple images may be displayed simultaneously with interactive alteration of the transparency of each image.

BACKGROUND OF THE INVENTION

As the use of computers to generate and display images has become more widespread, new applications have given rise to new and more complex requirements.

The requirement of overlaying images—that is, having a background image over which is displayed one or more foreground images—has existed for some time and has been solved by a number of methods. For example, U.S. Pat. No. 4,954,970 discloses a hardware based system (relying on a bidirectional multiple bus structure) to allow graphics overlay. U.S. Pat. No. 5,195,180 uses software to display characters over color backgrounds.

A more complex problem is created by the requirement that two images be displayed simultaneously in the same screen space (one on top of the other), but in a way such that all the features of each image are still visible. An example of an application which might require such graphical manipulation is a weather map. In such an application, the first image (the background image) would be a picture of a region of the earth on a clear day, and the second image would be a picture of the cloud cover over that region of the earth. The user wishes to see what areas of the first background image (the earth's surface) are obscured by the second image (cloud cover). In addition, the user needs to see through the cloud cover to assist him in identifying the specific areas affected.

In the prior art, three methods have been used to attempt to solve this problem.

The first method uses one image plane for the background and one for the foreground and then manipulates the foreground image separately. While this method can be successful, the use of multiple image planes can require significantly large memory capacity and processing power. As a result, the method requires, at a minimum, specialized workstations and graphics adapters, making it expensive to implement.

A second method requires generating a new composite image each time the transparency of the foreground is changed. This method has an advantage in that the color resolution of the background image is essentially unchanged. However, it has a significant drawback in that, for any non-trivial image size this method is very compute-intensive. As a result, this implementation will generally result in significant time lapse between successive images. Alternatively, if specialized hardware is used to provide faster response, using this method becomes expensive and may be hard to cost-justify for certain applications.

A third method generates a composite image by "spatial merging" of the pixels of the foreground and background images. Spatial merging is the reduction of the number of pixels of both the foreground and background image, and then combining the two pixel reduced images into one image. For example, assume image A and image B are both 800×800 pixel images, that is, each image consists of 640,000 pixels arranged in 800 columns by 800 rows. If all the even columns of image A were discarded and all the even rows were discarded, then A would consist of a 400×400 pixel image. Similarly, by discarding the odd rows and columns of image B, image B would be reduced to a 400×400 pixel image. If the two images were interleaved, pixel by pixel, row by row, column by column, an 800×800 pixel image C would be produced, where the even rows and columns of image C would be those of image A and the odd rows and columns of image C would be those of image B. Note that a pixel value in the image C is the same value as that of the image (A or B) from which it was taken so the color resolution of the images is maintained. However, on the average, the spatial resolution of the image is reduced by 50% in the x and y directions.

Unfortunately, for many applications, the color/spatial resolution trade off of this method is not acceptable. Generally, color resolution is more easily sacrificed: that is, high color resolution is not available in many of the images that users are exposed to daily, hence its lack is more easily dismissed, and, further, a reduction even by a factor of four or eight is generally not visible to the eye. Spatial resolution is more easily perceived by users and often more important in transmitting useful data through the display.

An additional drawback of the third method is that it requires recalculating the pixel values of the foreground image each time the transparency of the foreground image is changed. Thus, this method shares the same requirement for compute-power and special hardware as the second method and, accordingly, shares its cost drawbacks.

OBJECTS OF THE INVENTION

It is therefore an object of the invention to provide an improved method and means of displaying two images simultaneously by enabling a user to easily alter the transparency of the images relative to each other.

It is a further object of the invention to provide an implementation of simultaneous display which uses only one image plane.

It is yet a further object of the invention to provide this improved method of display on general-purpose computers and graphics display adapters, thereby providing a cost-effective solution for a broad variety of applications.

It is yet a further object of the invention to provide an improved method of display which reduces the amount of processing time required to display two images simultaneously.

SUMMARY OF THE INVENTION

These and other objects, features, and advantages of the invention are achieved by the method and system of dual image composition and display disclosed herein.

Figure 1:
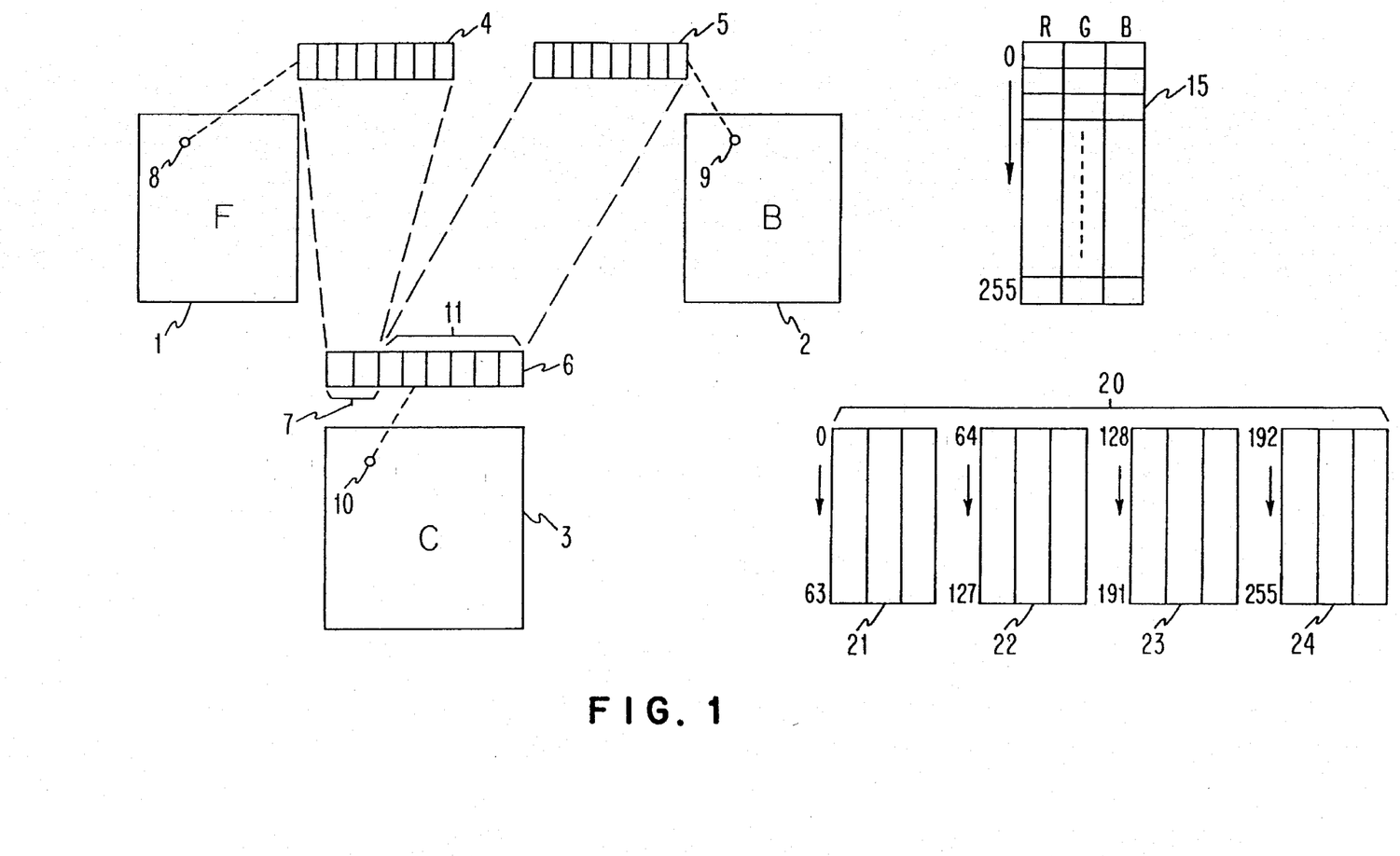
FIG. 1 is a schematic diagram of the method of the invention.

In a graphics display system including a memory for storing program instructions in a working area, a keyboard for entering commands, a mouse for entering commands, and a display device, the invention solves the problem of displaying two images simultaneously in the same screen space, with rapid alteration of the transparency of the foreground image with respect to the background image, without using multiple image planes. Referring to FIG. 1, a foreground F (1) and background B (2) image are combined to create a composite image C (3).

The invention uses as its input previously stored images. Using current technology, these images are stored in 8-bit formats—that is, each pixel to be displayed on the screen is represented by an 8-bit number. Each color value or number of a pixel is associated with the corresponding row entry in a Color Table (FIG. 1, 15).

The first step in creating a composite image is comprised of reducing the background image to a 6 bit map, Image B.' The second step in creating a composite image is comprised of reducing the foreground image to 2 bits (i.e. each 8-bit color value associated with a pixel of the foreground image is mapped to a 2-bit value), thereby creating Image E. Image F is created by multiplying each pixel of Image E by 64, to create a four-level image with pixel values of {0,64,128, 192}. The composite image C is then created by adding each pixel of Image B to each pixel of Image F. Referring to FIG. 1, pixel 8 of image F (1) and pixel 9 of image B (2), are combined to form pixel 10 of image C (3). This is achieved by taking the color value (4) associated with pixel 8 of the foreground image (1) and mapping it to the first two bits (7) of the color value 6 associated with pixel 10. The color value (5) associated with pixel 9 of the background image (2) is converted to the last 6 bits (11) of the color value 6.

A composite color table is then generated. That is, a color look-up table for the background image is created by reduction of the full 8-bit (256 levels) color table (FIG. 1, 15) to a 6-bit color table (64 levels) (FIG. 1, 21) while maintaining the same color range. This reduced color table (FIG. 1, 21) is duplicated three times (FIG. 1, 22, 23, 24) to create a full 256-level color table (FIG. 1, 20). The color table is manipulated to achieve the desired degree of transparency of the foreground image. The color table manipulation is performed as follows.

If total transparency of the foreground image is desired, no change is made to the four subtables. To display the foreground without transparency, the color values of each of the three 64-level color table sections from 64–255 are replaced by the three color values of the 2-bit foreground. To display the foreground with transparency, the color values of each of the three 64-level color table sections from 64–255 (FIG. 1, 22, 23, 24) are modified by shading the original 64-bit color value table (FIG. 1, 21) with the appropriate foreground color. The result of the manipulation then displayed. That is, the composite image is displayed using the composite color table.

This invention can be easily implemented only in software on a general-purpose computer using a general-purpose graphics adapter, so it avoids the requirement of special, costly, hardware features. Further, after the composite image is generated (a one-time operation), there is no performance dependency on the size of the image.

The use of only one image plane limits the color resolution of the composite image to the limit imposed by the graphics hardware, which is typically 8 bits. Thus, the sum of the color resolution of the background image and the foreground image is 8 bits. It will be noted, however, that by this means the spatial resolution of the composite image (i.e. the total number of pixels of the images—for example, 800 pixels by 800 pixels) is unchanged.

BRIEF DESCRIPTION OF THE DRAWINGS

These and other objects, features, and advantages of the invention will be more fully appreciated with reference to the accompanying figures.

DESCRIPTION OF THE PREFERRED EMBODIMENT OF THE INVENTION

FIG. 1 is a schematic diagram of the method of the invention. A foreground F (1) and background B (2) image are combined to create a composite image C (3) in a new display technique. At the same time, the color value table (15) used for images F and B is replaced by a color value table (20) made up of four subtables (21, 22, 23 and 24). By appropriate manipulation of the subtables, the foreground image can be made to fade in and out of the composite image C.

Figure 2:
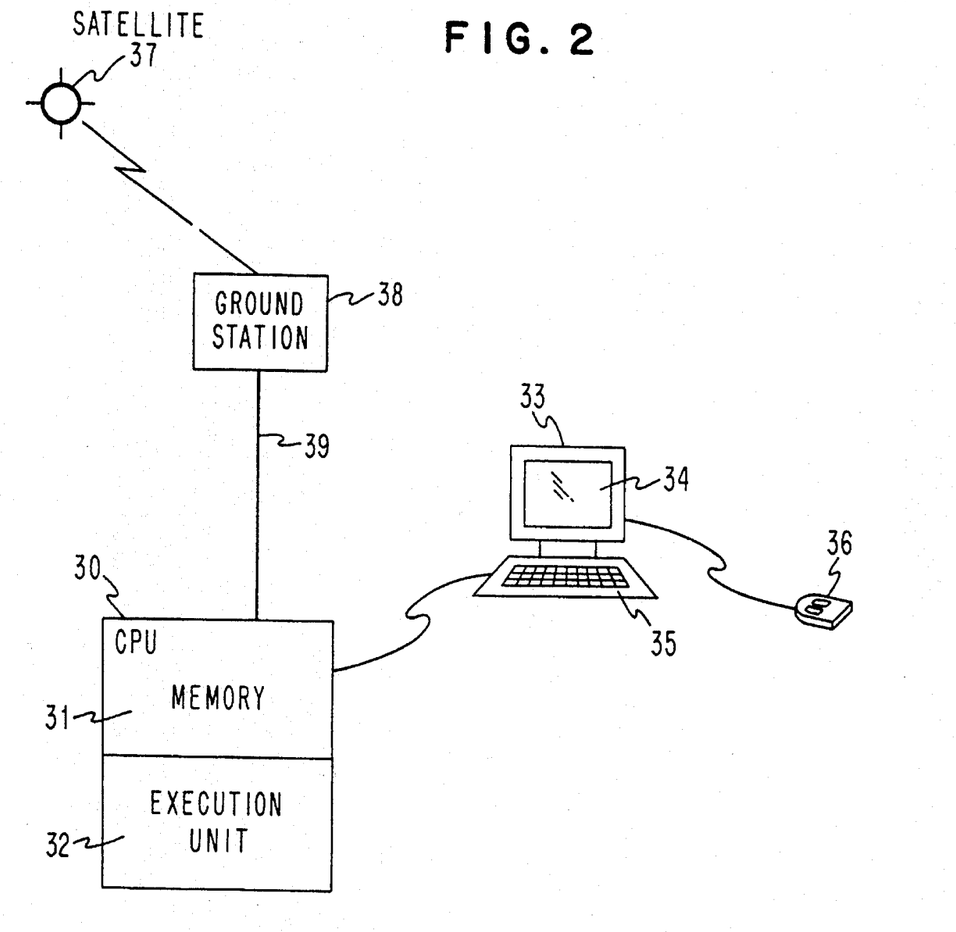
FIG. 2 is a schematic diagram of a graphics system on which the invention may be implemented.

The invention is employed on a graphical display system such as is displayed in FIG. 2 which includes a work station 33 having a display screen 34, a keyboard 35, and a mouse 36, all connected to a host data processor 30. Within the host data processor, there is included a memory 31 and an execution unit 32, the execution unit executing stored program instructions contained in the memory to carry out graphical display functions. The present embodiment of the invention is implemented on an IBM RISC System/6000 (Trademark of the International Business Machines Corporation) with 128 Megs of Memory and a hard drive of 500 MBytes. The operating system used is the IBM AIX version 3.2.2 (Trademark of the International Business Machines Corp.).

The invention uses as its input previously stored images. Such images can be received by graphics processing system from any number of sources such as such as scanning a preexisting picture, using pre-existing 8-bit digital images (such as weather satellite digital data) or the images may be created in the system through the use of graphical programs. FIG. 2 illustrates the second of these methods of receiving a graphical image: a weather satellite (37) sends 8-bit digital images to ground station (38) which in turn relays these pictures over a communication line (39) to the data processing system (30).

Using current technology, the images are stored in 8-bit formats—that is, each pixel to be displayed on the screen is represented by 8-bits. For example, an image on a display device could be displayed as 800 pixels by 800 pixels (a matrix of 800 points by 800 points or 640,000 points all together). Each point, or pixel, has an associated color value which is stored in a computer as a number ranging between 0 and 255, the range of numbers which can be stored in 8-bits ($2^8$=256). The stored 640,000 8-bits which represent the image are referred to as an 8-bit pixel map of the image. FIG. 1 schematically shows an 8-bit stored color value (4) associated with the pixel (8) from the foreground image (1) and an 8-bit stored color value (5) associated with the pixel (9) from the background image (2).

Each color value or number of a pixel is associated with the corresponding row entry in a Color Table (FIG. 1, 15). That is, the color table value can be used an index into the color table. The color table itself is 256 rows by 3 columns, the columns giving the values of red, green and blue primary colors. (Generally, the color table is 8 bits "wide," 3 bits for red, 3 for green and 2 for blue.) Thus, if the foreground image pixel 8 in FIG. 1 had an associated color value (4) of 41 and if the 42nd row of the color value table were {60,000; 0; 60,000}, then that pixel (8) would be displayed as an intense purple.

Figure 3:
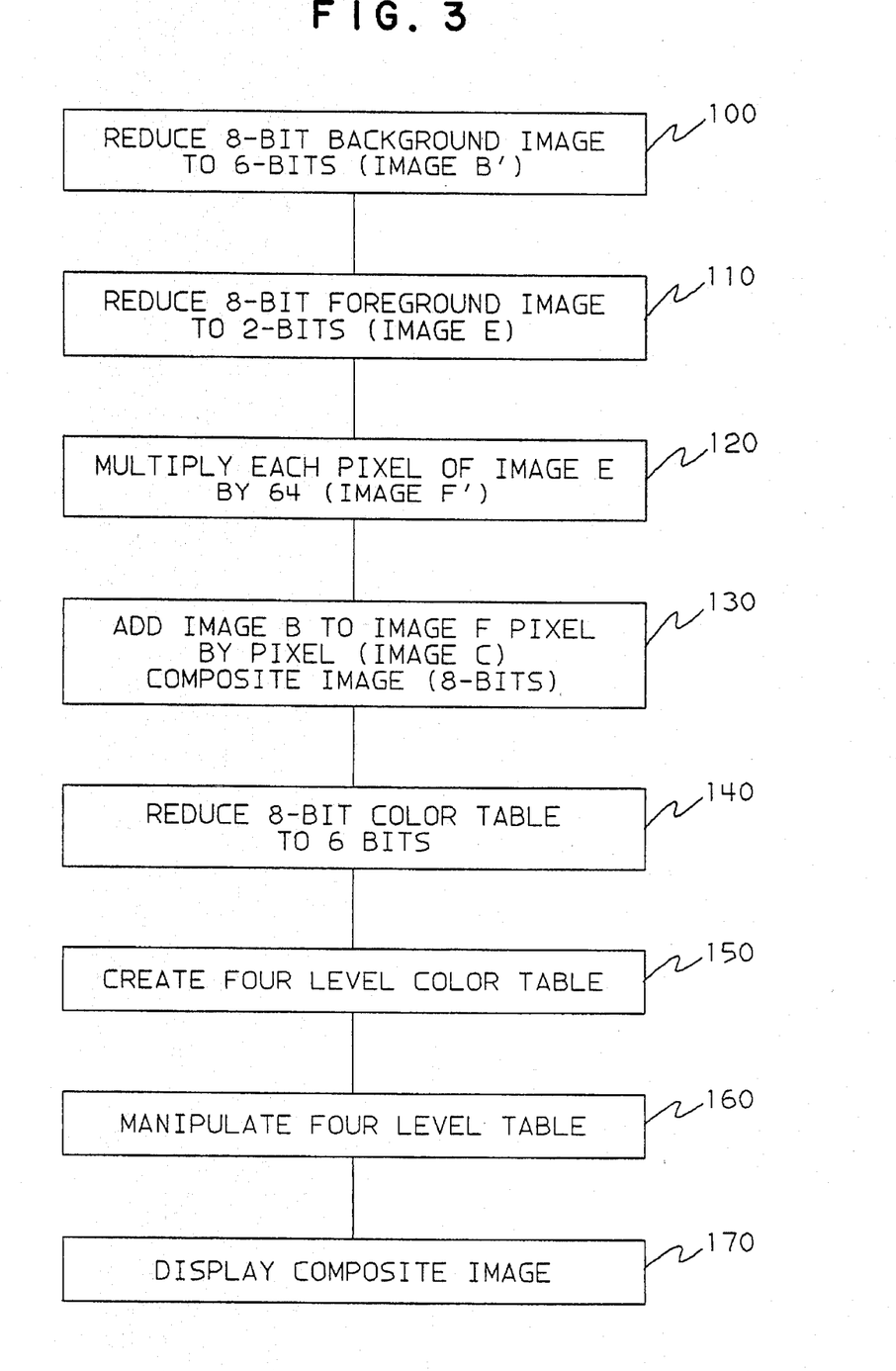
FIG. 3 is a flow diagram of the method of the invention.

FIG. 3 is a flow diagram of stored program instructions which were used in the present embodiment of the invention. (In operation, they would be stored in the memory (31) of the CPU (30) of FIG. 2)

Referring to FIG. 3, it will be seen that the invention is comprised of steps 100 through 130 in which a composite image is generated. This is performed by combining two images, a background image, Image B, and a foreground image, Image F, into an 8-bit image. This combination is achieved by using 6 bits for the background image, and 2 bits for the foreground image. In steps 140 and 150 a composite color table is created. In step 160, the color table is manipulated to provide the desired degree of transparency. Each of these steps is discussed in more detail below.

Referring to the flow diagram of FIG. 3, the first step in creating a composite image, step 100, is comprised of reducing the background image to a 6 bit map, Image B.' Thus, the 8-bit color value (5) associated with pixel 9 of the background image (2) in FIG. 1, would be reduced to 6-bits.

TABLE 1A

Pseudocode implementation of reducing a gray-scale background image to 6 bits

| 201 | for I = 1 to N loop |
| 202 | for J = 1 to M loop |
| 203 | B(I,J) = background(I,J)/4 |
| 204 | end for |
| 205 | end for |

For a grey-scale image, the background image can be reduced to a 6-bit representation by integer dividing each background image pixel by 4. An example of pseudo code which could be used to perform such function is found in Table 1A. More specifically, referring to Table 1A, Line 201 is the start of a LOOP which iterates over each pixel in the vertical direction of the image. "N" is the number of pixels in the vertical direction of the image. Line 202 is the start of a LOOP which iterates over each pixel in the horizontal direction of the image. "M" is the number of pixels in the horizontal direction of the image. Line 203 calculates one of the pixels of the output image of this step ("B") as the value of the same pixel index (I,J) in the original background image integer divided by 4. (Integer division is performed by dividing a number by another and dropping the remainder of the division. For example, 137 divided by 4 equals 34.25. An integer division of 137 by 4 would result in 34, or the largest number of integer multiples of the divisor which are contained by the dividend.)

TABLE 1B

Pseudocode Implementation of reducing a color background image to 6 bits

| 301 | for I = 1 to N loop | |
| 302 | for J = 1 to M loop | |
| 303 | temp1 = (01100000) AND background(I,J) | select lower 2 bits of green |
| 304 | temp2 = (00001100) AND background(I,J) | select lower 2 bits of red |
| 305 | temp3 = (00000011) AND background(I,J) | select both blue bits |
| 306 | B(I,J) = (temp1>>1) OR (temp2) OR (temp3) | recombine into 6 bit pixel |
| 307 | end for | |
| 308 | end for | |

For an 8-bit color image, which comprises 3 bits of green, 3 bits of red and 2 bits of blue, the bit reduction is more complicated, and is performed by removing bit 8 (one of the green bits) and bit 5 (one of the red bits). An example of the pseudo code which could be used to perform such function is found in Table 1B. More specifically, referring to Table 1B, Line 301 is the start of a LOOP which iterates over each pixel in the vertical direction of the image. "N" is the number of pixels in the vertical direction of the image. Line 302 is the start of a LOOP which iterates over each pixel in the horizontal direction of the image. "M" is the number of pixels in the horizontal direction of the image. Line 303 calculates a pixel value which is the value of the two of the green bits (out of the original three bits) of the background image at a specific pixel index (I,J). Line 304 does the same for two out of the three original red bits, and line 305 selects both of the original two blue bits of the original background image. Line 306 recombines the three color pieces (red, green and blue) into a 6 bit pixel.

TABLE 2

Pseudocode Implementation of reducing a foreground image to 6 bits

| 401 | for I = 1 to N loop |
| 402 | for J = 1 to M loop |
| 403 | E(I,J) = foreground(I,J)/64 |
| 404 | end for |
| 405 | end for |

The second step in creating a composite image, step 110, is comprised of reducing the foreground image to 2 bits (i.e. each 8-bit color value associated with a pixel of the foreground image is mapped to a 2-bit value), thereby creating Image E. This is achieved by integer dividing each foreground pixel by 64. An example of the pseudo code which could be used to perform such function is found in Table 2. More specifically, referring to Table 2, Line 401 is the start of a LOOP which iterates over each pixel in the vertical direction of the image. "N" is the number of pixels in the vertical direction of the image. Line 402 is the start of a LOOP which iterates over each pixel in the horizontal direction of the image. "M" is the number of pixels in the horizontal direction of the image. Line 403 calculates one of the pixels of the output image of this step ("E") as the value of the same pixel index (I,J) in the original foreground image integer divided by 64.

In summary, in steps 100 and 110, we have reduced the background and foreground images from 8 bits per pixel to 6 bit per pixel and 2 bits per pixel, respectively. The integer division that was done to accomplish this essentially evenly divides the original 256 pixel values of the image into 64 equal sections for the background image, and into 4 equal sections for the foreground image.

In an alternative implementation, the pixel histogram of each original image could be used to generate the reduced images B and E. The pixel histogram is a count, for each of the 256 pixel values, of how many pixels in the image have that pixel value. For example, a dark image would have most of the image pixels (total=N times M) having low values—0 indicates the lowest, or darkest, pixel value, while 255 indicates the highest, or brightest, pixel value. If the pixels in the image are not evenly distributed over the range 0–255, then creating a lower color resolution image as is done in steps 1 and 2 can degrade the quality of the resulting image more than is necessary. Looking at the pixel histogram can indicate whether to divide the pixels into a number of equal groups, or if the groups should be unevenly distributed among the 256 pixel values.

TABLE 3

Pseudocode Implementation of creating a 4-level (0, 64, 128, 192) foreground image.

| | |
|---|---|
| 501 | for I = 1 to N loop |
| 502 | for J = 1 to M loop |
| 503 | F(I,J) = E(I,J)*64 |
| 504 | end for |
| 505 | end for |

In step 120, Image F is created by multiplying each pixel of Image E by 64, to create a four-level image with pixel values of {0,64,128,192}. An example of the pseudo code which could be used to perform such function is found in Table 3. More specifically, referring to Table 3, Line 501 is the start of a LOOP which iterates over each pixel in the vertical direction of the image. "N" is the number of pixels in the vertical direction of the image. Line 502 is the start of a LOOP which iterates over each pixel in the horizontal direction of the image. "M" is the number of pixels in the horizontal direction of the image. Line 503 calculates one of the pixels of the output image of this step ("F") as the value of the same pixel index (I,J) in the "E" image multiplied by 64.

Although the above pseudo-code appears to undo step 2, remember that the division in step 2 was an integer operation, and the pixel values in image E are limited to {0,1,2,3}.

TABLE 4

Pseudocode Implementation of creating the composite image

| | |
|---|---|
| 601 | for I = 1 to N loop |
| 602 | for J = 1 to M loop |
| 603 | C(I,J) = F(I,J) + B(I,J) |
| 604 | end for |
| 605 | end for |

In step 130, the composite image C is created by adding each pixel of Image B to each pixel of Image F. An example of the pseudo code which could be used to perform such function is found in Table 4. More specifically, referring to Table 4, Line 601 is the start of a LOOP which iterates over each pixel in the vertical direction of the image. "N" is the number of pixels in the vertical direction of the image. Line 602 is the start of a LOOP which iterates over each pixel in the horizontal direction of the image. "M" is the number of pixels in the horizontal direction of the image. Line 603 calculates one of the pixels of the output image of this step ("C") as the value of the same pixel index (I,J) in the "F" image added to the value of the pixel index (I,J) in the B image.

As a result, the pixel values of the "F" image (either 0, 64, 128 or 192) are added to the pixel values of the "B" image (0 to 63) to produce the composite image "C" which has pixel values in the range (0 to 255).

An alternate implementation of step 130 utilizes the binary form of computer data. By mapping the two bits of the foreground to the first two bits of an 8-bit color value for C (FIG. 1, 6) and by mapping the six bits of the background to the last six bits of the 8-bit color value for C, one arrives at the same result.

The effect of steps 100 through 130 are schematically shown in FIG. 1. Image F (1), the foreground image, and image B (2), the background image, are combined to create image C (3), the composite. Thus, pixel 8 of image F (1) and pixel 9 of image B (2), are combined to form pixel 10 of image C (3). This is achieved by taking the color value (4) associated with pixel 8 of the foreground image (1) and mapping it to the first two bits (7) of the color value 6 associated with pixel 10. The color value (5) associated with pixel 9 of the background image (2) is converted to the last 6 bits (11) of the color value 6.

Figure 4:
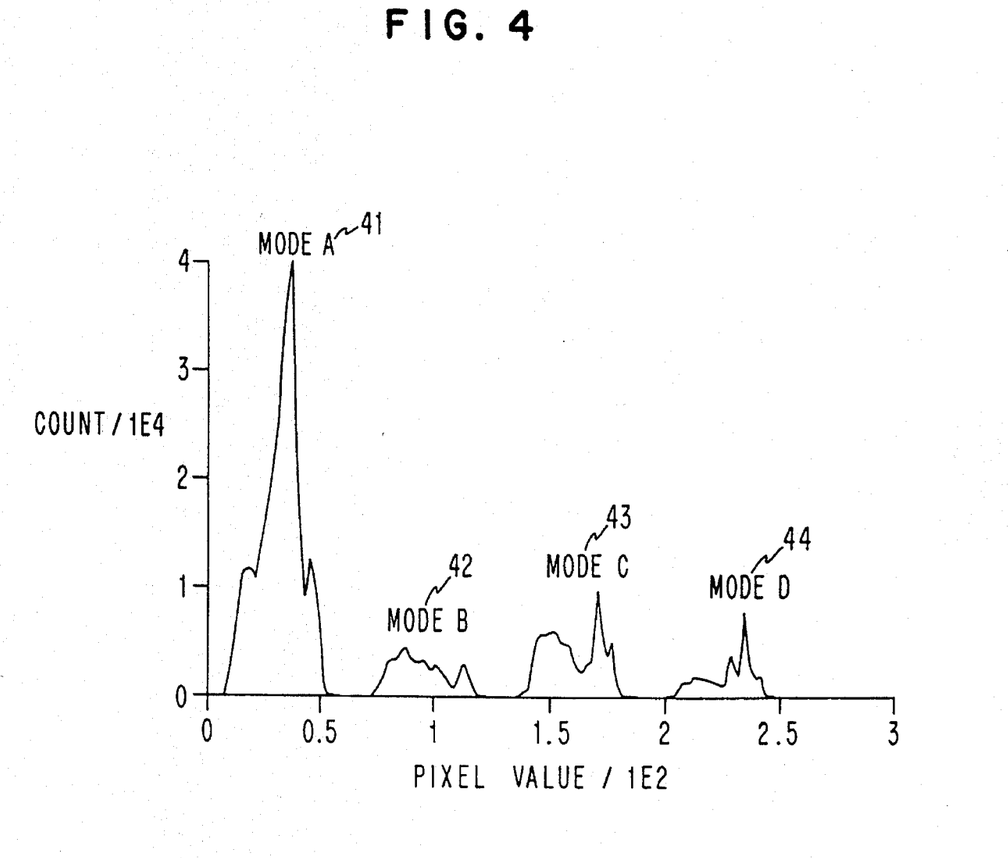
FIG. 4 is a composite histogram which shows the combination of a background image with levels 0 through 3 of a foreground image.
Figure 5:
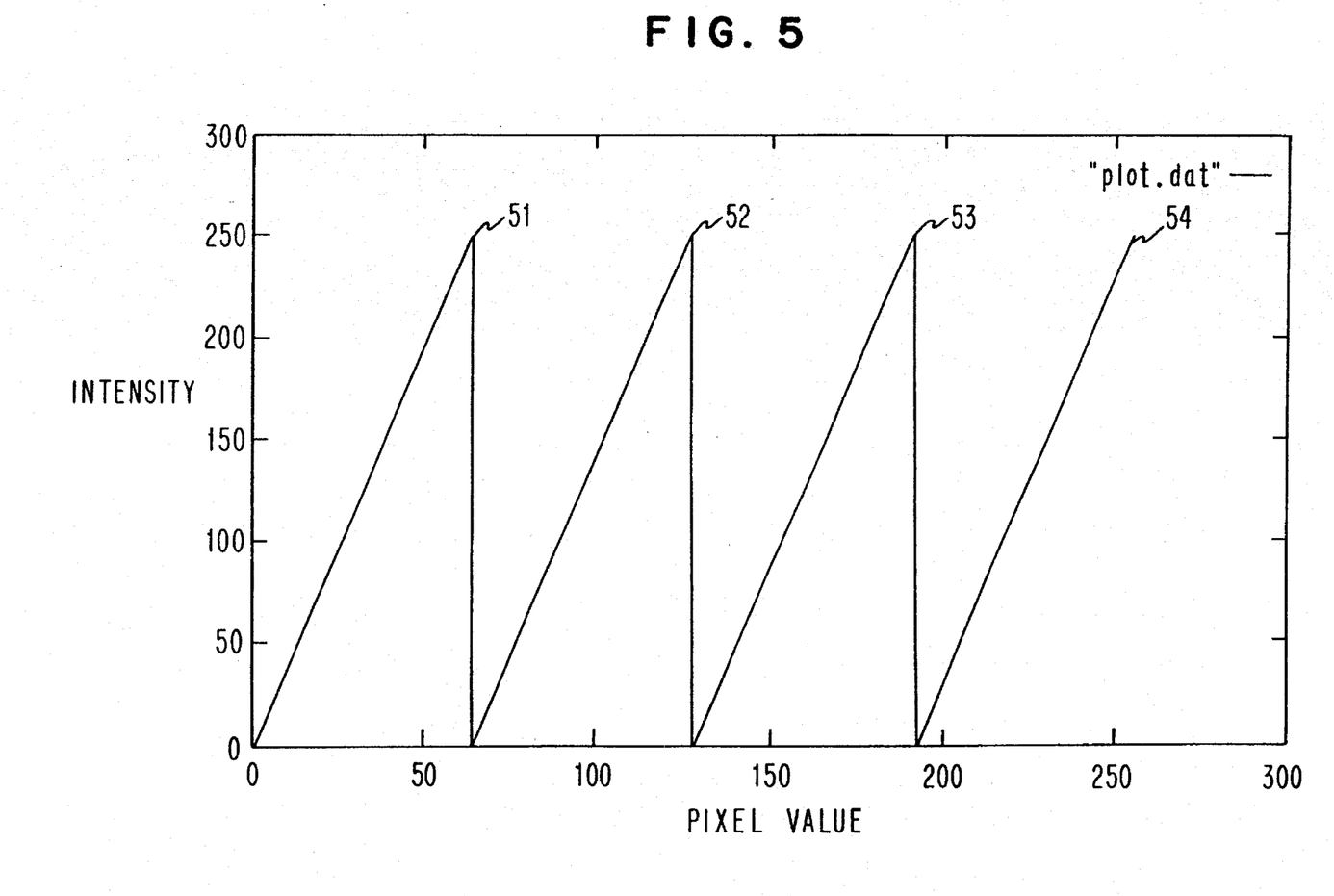
FIG. 5 is a plot of the intensity versus the pixel value of the four layer composite color table.

The effect of steps 100 through 130 can most clearly understood by referring to a composite histogram of each of these steps. FIG. 4 shows such a composite image histogram with four distinct modes. Mode A (41) is the histogram which represents the combination of the "B" image with the 0 level of the "E" image. Mode B (42) is the histogram which represents the combination of the "B" image with the 1 level of the "E" image. Mode C (43) is the histogram which represents the combination of the "B" image with the 2 level of the "E" image. Mode D (44) is the histogram which represents the combination of the "B" image with the 3 level of the "E" image.

In Step 140, a composite color table is generated. That is, a color look-up table for the background image is created by reduction of the full 8-bit (256 levels) color table (FIG. 1, 15) to 6-bits color table (64 levels) (FIG. 1, 21) while maintaining the same color range.

TABLE 5A

Pseudocode implementation of reducing the 8-bit gray-scale color table to 6 bits.

| | |
|---|---|
| 701 | for I = 0 to 63 loop |
| 702 | ReducedColorTableRed(I) = OriginalColorTableRed(I*4) |
| 703 | ReducedColorTableGreen(I) = OriginalColorTableGreen(I*4) |
| 704 | ReducedColorTableBlue(I) = OriginalColorTableBlue(I*4) |
| 705 | end for |

For a gray-scale or monochrome composite image, this can be done by keeping every fourth index in the original 8-bit color table. For a gray-scale image, the color table consists of identical pixel values for the red, green and blue portions of the color table, so the effect is that all of the colors are a shade of gray (from 0=black to 255=white). An example of the pseudo code which could be used to perform such function is found in Table 5A. More specifically, referring to Table 5A, Line 701 is the start of a LOOP which iterates over the range 0 to 63. Line 702 calculates the pixel value of the new color table at the index I as the pixel value of the original color table at the index (I times 4). Lines 703 and 704 calculate the pixel value of the new color table in the same manner.

TABLE 5B

Pseudocode Implementation of reducing the 8-bit full-color color table to 6 bits.

| | |
|---|---|
| 801 | Intensity[4] = {0, 21845, 43690, 65535} |
| 802 | L = 0 |
| 803 | for I = 0 to 3 loop |
| 804 |   for J = 0 to 3 loop |
| 805 |     for K = 0 to 3 loop |
| 806 |       ReducedColorTableRed(L) = Intensity(I) |
| 807 |       ReducedColorTableGreen(L) = Intensity(J) |
| 808 |       ReducedColorTableBlue(L) = Intensity(K) |
| 809 |       L = L + 1 |
| 810 |     end for |
| 811 |   end for |
| 812 | end for |

For a color composite image, the 8-bit color look-up table (3 bits green, 3 bits red and 2 bits blue) is reduced by creating a new 6-bit color look-up table with 2 bits each for red, green and blue. An example of the pseudo code which could be used to perform such function is found in Table 5B. More specifically, referring to Table 5B, Line 801 sets up the array Intensity as an even distribution of pixel values from 0 to 65,535, which is the highest value for each of the three portions (red, green and blue) of a pixel. Line 802 initializes the value of the variable L to 0. L is used as the index into the new color table, which consists of the arrays "ReducedColorTableRed," "ReducedColorTableGreen" and "ReducedColorTableBlue." Line 803 is the start of a LOOP from 0 to 3 as are Lines 804 and 805. These three nested loops mean that lines 806, 807, 808 and 809 are executed 64 times (64=4 times 4 times 4). L ranges in value from 0 to 63. Lines 806, 807 and 808 combine the four Intensity array values into 64 different combinations. Line 809 increments the variable L (which will range from 0 to 63).

The values in the array Intensity above were selected to provide an even intensity distribution from the lowest intensity (0) to the highest (65,535) with only 4 values.

TABLE 6

Pseudocode Implementation of creating a 256 level (8-bit) color table from the 6-bit reduced color table

| | |
|---|---|
| 901 | for I = 0 to 63 loop |
| 902 |   ColorTableRed(I) = ReducedColorTableRed(I) |
| 903 |   ColorTableRed(I + 64) = ReducedColorTableRed(I) |
| 904 |   ColorTableRed(I + 128) = ReducedColorTableRed(I) |
| 905 |   ColorTableRed(I + 192) = ReducedColorTableRed(I) |
| 906 |   ColorTableBlue(I) = ReducedColorTableBlue(I) |
| 907 |   ColorTableBlue(I + 64) = ReducedColorTableBlue(I) |
| 908 |   ColorTableBlue(I + 128) = ReducedColorTableBlue(I) |
| 909 |   ColorTableBlue(I + 192) = ReducedColorTableBlue(I) |
| 910 |   ColorTableGreen(I) = ReducedColorTableGreen(I) |
| 911 |   ColorTableGreen(I + 64) = ReducedColorTableGreen(I) |
| 912 |   ColorTableGreen(I + 128) = ReducedColorTableGreen(I) |
| 913 |   ColorTableGreen(I + 192) = ReducedColorTableGreen(I) |
| 914 | end for |

In step 150 this reduced color table (FIG. 1 21) is duplicated three times (FIG. 1, 22, 23, 24) to create a full 256-level color table (FIG. 1, 20). (The first copy (21) of the reduced color table represents levels (or indices) 1–63, the second copy (22) represents levels 64 to 127, the third (23) represents levels 128 to 191, and the fourth (24) represents levels 192 to 255.) An example of the pseudo code which could be used to perform such function is found in Table 6. More specifically, referring to Table 6, Line 901 is the start of a loop from 0 to 63 which iterates over the values of ReducedColorTable (which has 64 values). Line 902 copies the Red pixel value of ReducedColorTable to the new color table ColorTable at the same pixel index I. Line 903 copies the pixel value in ReducedColorTable at the index I into ColorTable at the pixel index(I+64). Lines 904 and 905 duplicate this copy from ReducedColorTable(I)to ColorTable(I+128) and ColorTable(I+ 192). Lines 906–913 duplicate the processing of lines 902–905 for Blue and Green portions of the color tables.

The four identical parts of the color table created in this step (FIG. 5, 51, 52, 53 and 54) correspond to the four modes (41, 42, 43, 44) of the composite image histogram found in FIG. 4.

In step 160, the color table is manipulated to achieve the desired degree of transparency of the foreground image. The color table manipulation is performed as follows.

If total transparency of the foreground image id desired, no change is made to the four subtables. With no changes to the color table, only the background image is visible. Recall that an individual color value for a pixel was a combination of background and foreground images: the last six bits were from Image B, the first 2 from Image F. (FIG. 1, 6). Recall also that the total 8 bits represents an index value (ranging from 0–256) which will be used against the color table. If the first two bits are "00", the index is equal to the value V of the first six bits—a number between 0 and 63 and the appropriate color value from the table is the vth entry of the first copy of the table. If the first two bits are "01," then the binary number is increased by 64 and the appropriate color value from the table is the vth entry of the second copy of the table. If the first two bits are "10," entry is the vth of the third table. If the first two bits are "11," 192 is added to the original number v, and the appropriate color value is the vth entry of the fourth table.

Thus, if there are no changes to the color table, i.e. each copy is the same, then no matter what the contribution from the foreground table to the last two bits, the value for the pixel is always the vth entry of the appropriate table and all vth entries are identical to the vth entry of the first table—which is the value of the pixel in the original background image B.

To display the foreground without transparency, the color values of each of the three 64-level color table sections from 64–255 are replaced. More specifically, since the color value of the foreground image (FIG. 1, 4) was mapped to a two bit color value in the composite (FIG. 1, 7), the foreground can only have one of four values. The first value, "00" is used as "transparent," that is, there is no foreground image. The three color value subtables (FIG. 1, 22, 23, 24) are changed to the three color values. Thus, if the three values were red, green, and blue, then each value of the second color subtable would be red. If the first two bits are "00", the index is equal, the index is equal to the value v of the first six bits—a number between 0 and 63 and the appropriate color value from the table is the vth entry of the first copy of the table. If the first two bits are "01" (i.e. the foreground pixel is red), then the binary number is increased by 64 and the appropriate color value from the table is the vth entry of the second copy of the table— which is red (as are all the entries of this table). If the first two bits are "10" (i.e. the foreground pixel is green), entry is the vth of the third table, all of whose entries are green. If the first two bits are "11" (i.e. the foreground pixel is blue) 191 is added to the original number v, and the appropriate color value is the vth entry of the fourth table, all of whose entries are blue.

To display the foreground with transparency, the color values of each of the three 64-level color table sections from 64–255 are modified. More specifically, the original 64-bit color value table (FIG. 1, 21), is shaded with the appropriate foreground color. Thus, in our example, the entries of table 22 of FIG. 1 would be the original values of table 21 shaded red. The degree of shading controls of desired degree of transparency. Again, when the image is displayed, if the first two bits of a pixel are "00", the index is equal to the to the value v of the first six bits—a number between 0 and 63 and the appropriate color value from the table is the vth entry of the first copy of the table. If the first two bits are "01" (i.e. the foreground pixel is red), then the binary number is increased by 64 and the appropriate color value from the table is the vth entry of the second copy of the table—which is the vth entry of the first color table (the background pixel color) shaded red. The same analogous analysis applies for "10" (green) and "11" (blue) as was performed above. Since the vth entry is a shaded background color value in the color table, the display gives a foreground shaded background— the foreground is shown transparently against the background.

TABLE 7

Pseudocode Implementation of manipulating the color table to change the transparency of the foreground part of the composite image

| 1001 | for I = 0 to 63 |
| 1002 | ColorTableRed(I + 64) = ColorTableRed(I + 64) + X |
| 1003 | ColorTableRed(I + 128) = ColorTableRed(I + 128) + Y |
| 1004 | ColorTableRed(I + 192) = ColorTableRed(I + 192) + Z |
| 1005 | ColorTableGreen(I + 64) = ColorTableGreen(I + 64) + X |
| 1006 | ColorTableGreen(I + 128) = ColorTableGreen(I + 128) + Y |
| 1007 | ColorTableGreen(I + 192) = ColorTableGreen(I + 192) + Z |
| 1008 | ColorTableBlue(I + 64) = ColorTableBlue(I + 64) + X |
| 1009 | ColorTableBlue(I + 128) = ColorTableBlue(I + 128) + Y |
| 1010 | ColorTableBlue(I + 192) = ColorTableBlue(I + 192) + Z |
| 1011 | end for |

An example of the pseudo code which could be used to perform the shading of the color tables is found in Table 7. More specifically, referring to Table 7, Line 1001 is the start of a loop from 0 to 63 which iterates over the unique values of ColorTable (which has 64 unique values out of a total of 256 values). Lines 1002–1004 increase the pixel value for the red portion of ColorTable from the index of 64 to the index of 255. Lines 1005–1010 repeat this processing for the green and blue portions of ColorTable.

It should be noted that, in increasing the color values of each of the tables, the relative weights are kept the same. For example, if the kth values of the first table is 2,000/0/2,000, the kth value of the third table would be increased to 4,000/0/4,000.

TABLE 8

Pseudocode Implementation of resetting the color table to its original values so that the foreground part of the composite image is no longer visible

| 1101 | for I = 0 to 63 |
| 1102 | ColorTableRed(I + 64) = ColorTableRed(I) |
| 1103 | ColorTableRed(I + 128) = ColorTableRed(I) |
| 1104 | ColorTableRed(I + 192) = ColorTableRed(I) |
| 1105 | ColorTableBlue(I + 64) = ColorTableBlue(I) |
| 1106 | ColorTableBlue(I + 128) = ColorTableBlue(I) |
| 1107 | ColorTableBlue(I + 192) = ColorTableBlue(I) |
| 1108 | ColorTableGreen(I + 64) = ColorTableGreen(I) |
| 1109 | ColorTableGreen(I + 128) = ColorTableGreen(I) |
| 1110 | ColorTableGreen(I + 192) = ColorTableGreen(I) |
| 1111 | end for |

To return to showing only the background image, the upper three sections of the color table are returned to their original values, which are identical to the values of the 0–63 section. An example of the pseudo code which could be used to perform such function is found in Table 8. More specifically, referring to Table 8, Line 1101 is the start of a loop from 0 to 63 which iterates over the unique values of ColorTable (which has 64 unique values out of a total of 256 values). Lines 1102–1104 reset the pixel value for the red portion of ColorTable from the index of 64 to the index of 255. Lines 1105–1110 repeat this processing for the green and blue portions of ColorTable.

In step 170, the result of the manipulation displayed on display device 34 of FIG. 2. That is, the composite image is displayed using the composite color table.

Figure 6:
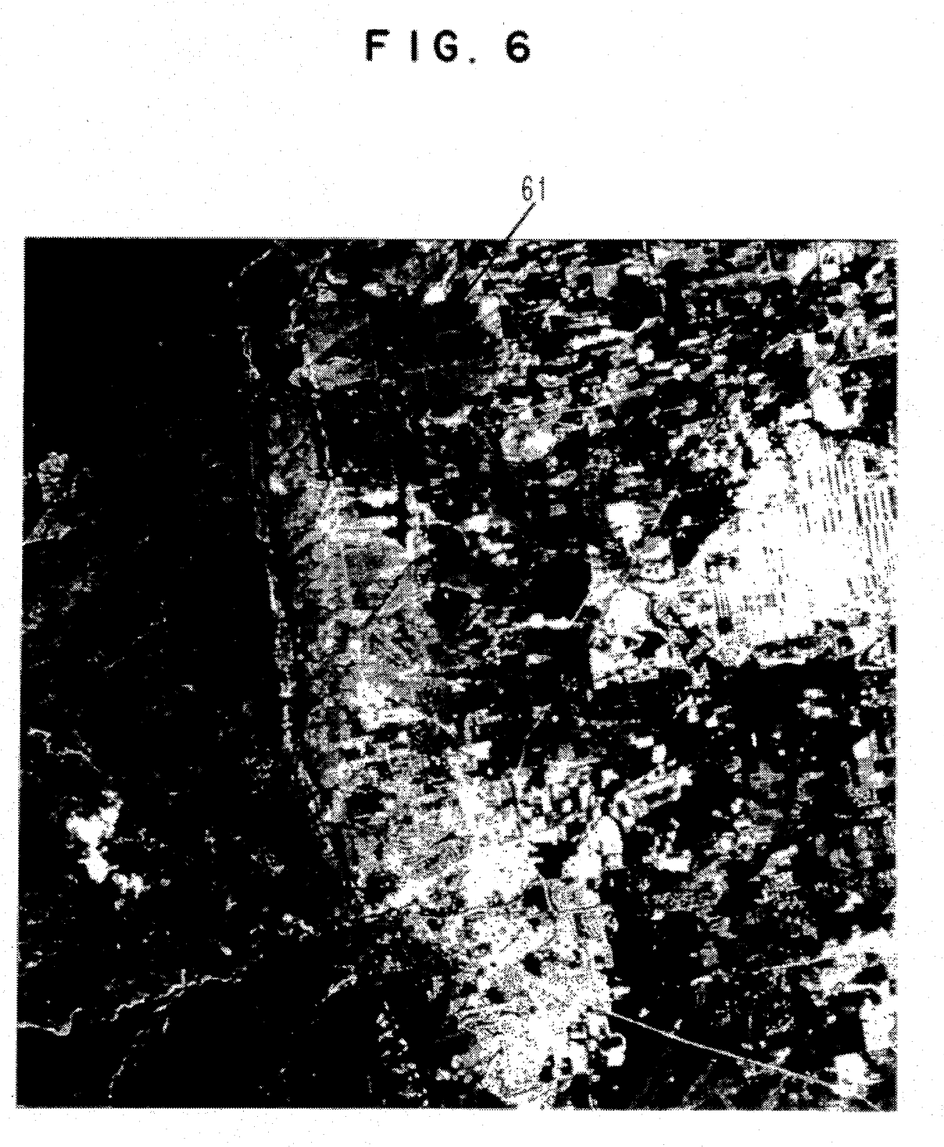
FIG. 6 is an example of a composite image in which the foreground image of cloud cover is transparent and only the background earth surface features are visible.
Figure 7:
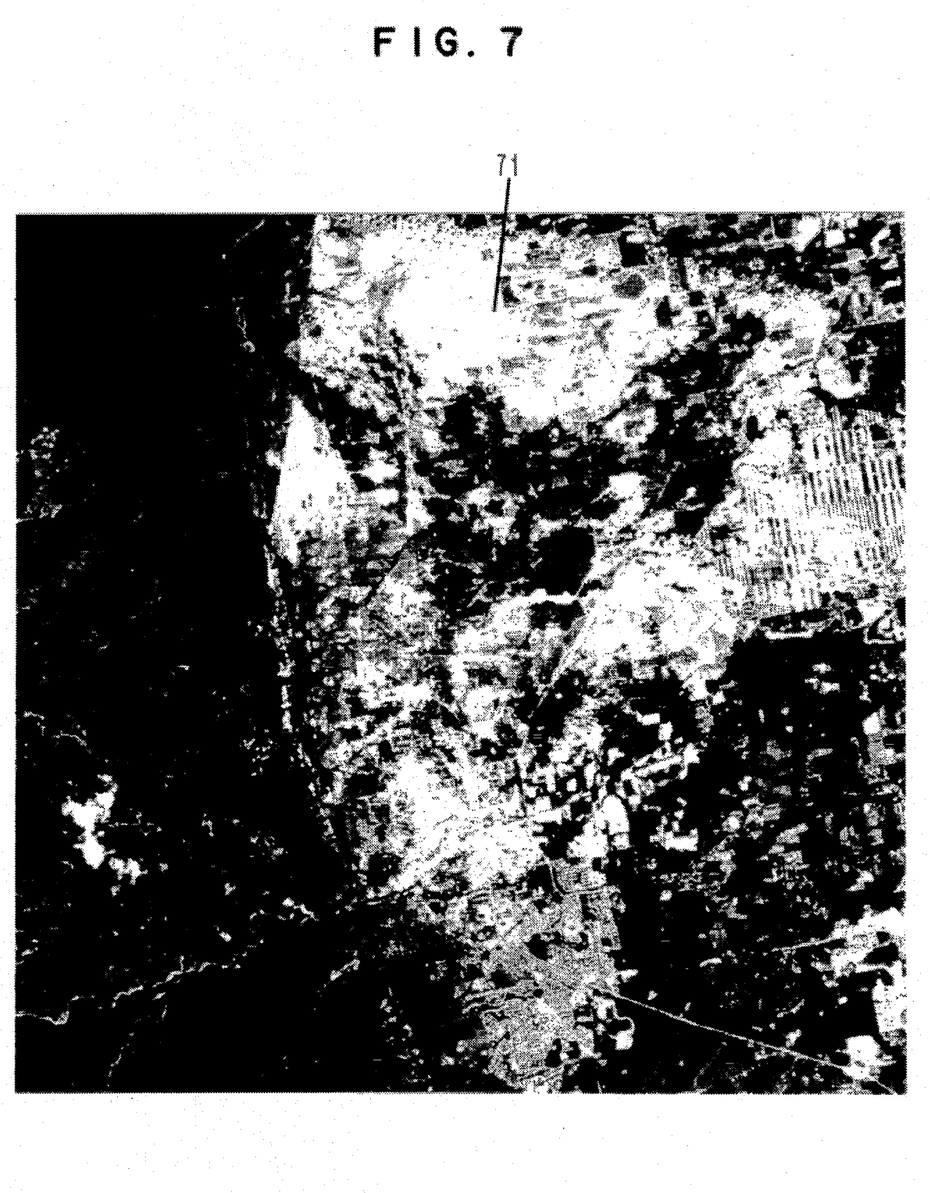
FIG. 7 is an example of a composite image as seen in FIG. 6 in which the foreground image of cloud cover is only partially transparent.
Figure 8:
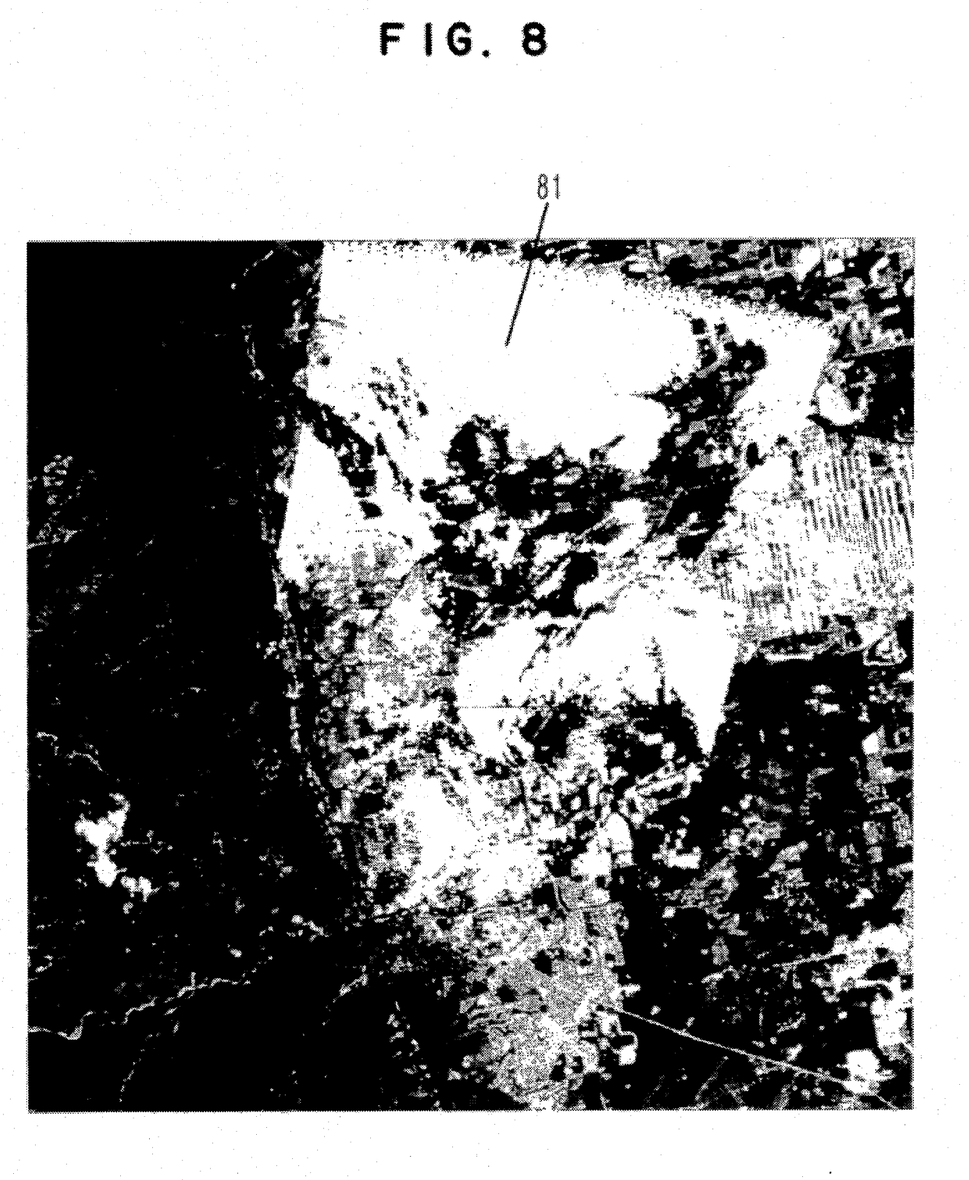
FIG. 8 is an example of a composite image as seen in FIG. 8 in which the foreground image of cloud cover is fully visible (nontransparent).

FIGS. 6 through 8 are examples of the result of manipulation of the color table. FIG. 6 is an example of a composite image in which the foreground image of cloud cover is transparent and only the background earth surface features are visible. Note that the roads and fields identified as 61 are fully visible. FIG. 7 is an example of a composite image as seen in FIG. 6 in which the foreground image of cloud cover is only partially transparent. Note that only part of the roads and fields (seen as 61 of FIG. 6) are visible (FIG. 7, 71). FIG. 8 is an example of a composite image as seen in FIG. 8 in which the foreground image of cloud cover is fully visible or nontransparent (FIG. 8, 81) and the background roads and fields are obscured.

The above described invention provides a less costly solution to the problem of displaying multiple objects in the same display image, since it requires no specialized hardware. Further, to change the degree of transparency of the foreground image, one need only change the values in the color table (256 values). In prior art implementations, each value of the 800×800 pixels would have to be changed— taking significantly more time and processing power.

The above described invention allows the foreground to be displayed in only four modes: transparent and three colors. If the requirement was to show the foreground in more colors, then foreground 8-bit pixels would have to be mapped to 4 or 6 bits and the background image pixels mapped to 4 or 2 bits respectively. Mapping the foreground to 6 bits and the background to 2 bits uses the same subsets of the color tables as was described above. (Merely switch the words "foreground" and "background" in the above discussion.) If the foreground is mapped to 4 bits, 16 subtables of 16 entries or levels each are used.

The invention has been discussed in the context of a graphics system which uses 8-bit pixel maps and 256 values for the displayed colors. However, the invention also has application in graphics systems which use pixel maps based on a different number of bits and a different number of displayed colors. The example used in the above discussion was an 800×800 pixel map. The invention is also applicable to pixel maps having a greater or fewer number of pixels.

Although a specific embodiment of the invention has been disclosed it will be understood by those having skill in the art that changes can be made in the specific embodiment disclosed, without departing from the spirit and scope of the invention. For example, such changes include, but are not limited to, an alternate implementation of the generation of the composite image which could take into account the pixel histogram for both the original background and foreground images. Although the implementation has been disclosed within the context of a stand-alone system, it could also find application in distributed systems.

Accordingly, we claim:

1. In a graphics processing system comprised of a processor for executing commands, a memory for storing images, at least one input device for entering commands, and a display device, a method of displaying a composite image comprising a foreground image superimposed over a background image, said method comprising the steps of:

receiving and storing a background image and a foreground image in said memory, said background image being stored as a background pixel map having an entry associated with each pixel of said background image, said foreground image being stored as a foreground pixel map having an entry associated with each pixel of said foreground image, each entry of said foreground pixel map being associated with a foreground x-y coordinate of said associated foreground pixel and containing a foreground-value used as an index into a color value table, each entry of said background pixel map being associated with a background x-y coordinate of said associated background pixel and containing a background-value used as an index into a color value table;

creating a composite pixel map having an entry for each pixel of said composite image, each entry of said composite pixel map being associated with a composite x-y coordinate of said associated composite pixel and containing a composite-value, each entry comprising a first part and a second part, said first part being created from the entry of said background pixel map having a background x-y coordinate equal to said composite x-y coordinate, said second part being created from the entry of said foreground pixel map having a foreground x-y coordinate equal to said composite x-y coordinate;

creating a composite color table comprised of subtables, a first subset of said subtables being associated with said first part of said entries of said composite map and a second subset of said subtables being associated with said second part of said entries of said composite map;

modifying said second subset of said subtables to provide a specified degree of transparency for said foreground image in said composite image; and displaying said composite pixel map using said composite color table.

2. In a graphics processing system comprised of a processor for executing commands, a memory for storing images, at least one input device for entering commands, and a display device, a method comprising the steps of:

receiving and storing a background image and a foreground image in said memory, each of said background and foreground images being stored as a w-bit pixel map;

converting said w-bit pixel map of said background image to a m-bit map of said background image, m being a number less than w;

converting said w-bit pixel map of said foreground image to a n-bit pixel map of said foreground image, where the sum of m plus n equals w and where each pixel of said n-bit pixel map has a numeric value ranging from 0 to $(2^n-1)$ and each of said numeric values has an associated color value;

combining said m-bit pixel map of said background image and said n-bit map of said foreground image into a w-bit map of a combined image;

creating a combined composite color table comprised of $2^n$ subtables, each of said subtables having $2^m$ color values and each of said subtables having a unique subtable index number with a value between 0 and $(2^n-1)$;

receiving a command from a first input device, said command specifying a desired degree of transparency of display of said foreground image;

if said command specifies total transparency, not modifying said $2^n$ subtables;

if said command specifies total non-transparency, modifying said second through said $2^n$th subtables by modifying all entries of each subtable to said associated color value associated with said subtable's unique index number;

if said command specifies a first degree of transparency, modifying said second through said $2^n$th subtables by replacing each entry of each subtable with a first replacement color value, where said first replacement color value represents the color value of said entry shaded by the associated color value associated with said subtable's unique index number; and displaying said combined image by using a combined color table comprised of said $2^n$ subtables.

3. A method as in claim 2 wherein said step of combining said m-bit pixel map and said n-bit pixel map into a w-bit map of a combined image is comprised of creating a second n-bit pixel map of said foreground image by multiplying each bit of said n-bit pixel map of said foreground image by $2^m$ and adding, pixel by pixel, said value in said second n-bit pixel map to said value in said m-bit pixel map.

4. A method as in claim 2 which also includes:

if said command specifies a second degree of transparency, said second degree of transparency being less transparent than said first degree of transparency, modifying said second through said $2^n$th subtables by replacing each entry of each subtable with a second replacement color value where said second replacement color value represents the color value of said entry shaded with more of said associated color value associated with said subtable's unique index number than said first replacement color value.

5. A method as in claim 2 wherein the value of n is 2 and the value of w is 8.

6. A method as in claim 2 wherein the value of n is 4 and the value of w is 8.

7. A graphics processing system comprised of a processor for executing commands, a memory device for storing images, at least one input device for entering commands, and a display device, said system further comprising:

means for receiving and storing a background image and a foreground image in said memory device, each of said background and foreground images being stored as an 8-bit pixel map;

means for converting said 8-bit pixel map of said background image to a m-bit map of said background image;

means for converting said 8-bit pixel map of said foreground image to a n-bit pixel map of said foreground image, where the sum of m plus n equals eight and where each pixel of said n-bit pixel map has a numeric value ranging from 0 to ($2^n-1$) and each of said numeric values has an associated color value;

means for combining said m-bit pixel map of said background image and said n-bit map of said foreground image into an 8-bit map of a combined image;

means for creating a combined composite color table comprised of $2^n$ subtables, each of said subtables having $2^m$ color values and each of said subtables having a unique subtable index number with a value between 0 and ($2^n-1$);

means for receiving a command from a first input device, said command specifying a desired degree of transparency of display of said foreground image;

means for modifying said subtables, said modification being dependent on said received command, wherein:

if said command specifies total transparency, no modification is performed;

if said command specifies total non-transparency, said modification is comprised of modifying all entries of said second through said $2^n$th subtables by replacing all entries of each subtable with said associated color value associated with said subtable's unique index number;

if said command specifies a first degree of transparency, said modification is comprised of modifying said second through said $2^n$th subtables by replacing each entry of each subtable with a first replacement color value, where said first replacement color value represents the color value of said entry shaded by the associated color value associated with said subtable's unique index number; and if said command specifies a second degree of transparency, said second degree of transparency being less transparent than said first degree of transparency, said modification is comprised of modifying said second through said $2^n$th subtables by replacing each entry of each subtable with a second replacement color value where said second replacement color value represents the color value of said entry shaded with more of said associated color value associated with said subtable's unique index number than said first replacement color value; and display means for displaying said combined image by using a combined color table comprised of said $2^n$ subtables.

8. A system as in claim 7, wherein said means for combining said m-bit pixel map of said background image and said n-bit map of said foreground image into an 8-bit map of a combined image comprises:

means for creating a second n-bit pixel map of said foreground image by multiplying each bit of said n-bit pixel map of said foreground image by $2^m$; and means for adding said second n-bit pixel map pixel-by-pixel to said m-bit pixel map.

9. A system as in claim 7 wherein n=2.

10. A system as in claim 7 wherein n=4.

* * * * *